United States Patent
Iwamura et al.

(10) Patent No.: US 11,368,716 B2
(45) Date of Patent: Jun. 21, 2022

(54) IMAGE ENCODING DEVICE, IMAGE DECODING DEVICE AND PROGRAM

(71) Applicant: NIPPON HOSO KYOKAI, Tokyo (JP)

(72) Inventors: Shunsuke Iwamura, Tokyo (JP); Atsuro Ichigaya, Tokyo (JP); Shimpei Nemoto, Tokyo (JP)

(73) Assignee: NIPPON HOSO KYOKAI, Tokyo (JP)

( * ) Notice: Subject to any disclaimer, the term of this patent is extended or adjusted under 35 U.S.C. 154(b) by 0 days.

(21) Appl. No.: 17/175,098

(22) Filed: Feb. 12, 2021

(65) Prior Publication Data

US 2021/0176495 A1 Jun. 10, 2021

Related U.S. Application Data

(63) Continuation of application No. PCT/JP2019/031561, filed on Aug. 9, 2019.

(30) Foreign Application Priority Data

Aug. 15, 2018 (JP) .............................. JP2018-152988

(51) Int. Cl.
*H04N 19/11* (2014.01)
*H04N 19/593* (2014.01)
(Continued)

(52) U.S. Cl.
CPC ......... *H04N 19/593* (2014.11); *H04N 19/105* (2014.11); *H04N 19/11* (2014.11);
(Continued)

(58) Field of Classification Search
CPC .... H04N 19/593; H04N 19/105; H04N 19/11; H04N 19/12; H04N 19/159; H04N 19/176; H04N 19/186; H04N 19/61
(Continued)

(56) References Cited

U.S. PATENT DOCUMENTS

2015/0043641 A1 2/2015 Gamei et al.
2015/0063438 A1 3/2015 Kim et al.

FOREIGN PATENT DOCUMENTS

JP 2015-515236 A 5/2015
JP 2015-515821 A 5/2015
JP 2018-078409 A 5/2018

OTHER PUBLICATIONS

Series H: Audiovisual and Multimedia Systems Infrastructure of audiovisual services—Coding of moving video, ITU-T, Telecommunication Standardization Sector of ITU, H.265, (Dec. 2016), High efficiency video coding.
(Continued)

*Primary Examiner* — Nguyen T Truong
(74) *Attorney, Agent, or Firm* — Studebaker & Brackett PC

(57) ABSTRACT

An image encoding device (1) includes the cross-component intra predictor (171*a*) generates a predicted chroma block through cross-component intra prediction in which a chroma block to be encoded is predicted by referring to, as the neighbouring decoded pixels adjacent to the chroma block, decoded luminance pixels and decoded chroma pixels, a candidate generator (181) configured to generate candidates for an orthogonal transform type to be applied to orthogonal transform processing on prediction residuals that represent errors between the predicted chroma block and the chroma block; and a transformer (121) configured to perform the orthogonal transform processing on the chroma prediction residuals by using an orthogonal transform type selected from among the candidates generated by the candidate generator (181). The candidate generator (181) generates the candidates for the orthogonal transform type, depending on whether or not positions of the neighbouring decoded pixels referred to in cross-component intra prediction are to only
(Continued)

any one of a top, a bottom, a left, and a right of a chroma block.

11 Claims, 11 Drawing Sheets

(51) Int. Cl.
  *H04N 19/105* (2014.01)
  *H04N 19/12* (2014.01)
  *H04N 19/159* (2014.01)
  *H04N 19/176* (2014.01)
  *H04N 19/186* (2014.01)
  *H04N 19/61* (2014.01)

(52) U.S. Cl.
  CPC ........... *H04N 19/12* (2014.11); *H04N 19/159* (2014.11); *H04N 19/176* (2014.11); *H04N 19/186* (2014.11); *H04N 19/61* (2014.11)

(58) Field of Classification Search
  USPC ..................................................... 375/240.12
  See application file for complete search history.

(56) References Cited

OTHER PUBLICATIONS

Huanbang Chen et al., Description of SDR, HDR and 360° video coding technology proposal by Huawei, GoPro, HiSilicon, and Samsung, buJoint Video Exploration Team (JVET) of ITU-T SG 16 WP 3 and ISO/IEC JTC 1/SC 29/WG 11, Document: JVET-J0025_v2, 10th Meeting: San Diego, US, Apr. 10-20, 2018.

Chih-Wei Hsu et al., Description of SDR video coding technology proposal by MediaTek, Joint Video Experts Team (JVET) of ITU-T SG 16 WP 3 and ISO/IEC JTC 1/SC 29/WG 11, Document: JVET-J0018 10th Meeting: San Diego, US, Apr. 10-20, 2018.

Geert Van der Auwera, Description of Core Experiment 3: Intra Prediction and Mode Coding, Joint Video Experts Team (JVET) of ITU-T SG 16 WP 3 and ISO/IEC JTC 1/SC 29/WG 11, Document: JVET-J1023_r2, 10th Meeting: San Diego, USA, Apr. 10-20, 2018.

Hui Yong Kim et al., Mode-dependent DCT DST for chroma, Joint Collaborative Team on Video Coding (JCT-VC) of ITU-T SG 16 WP 3 and ISO/IEC JTC 1/SC 29/WG 11, Document JCTVC-10415 9th Meeting Geneva, CH, Apr. 27-May 7, 2012.

Shunsuke Iwamura et al., CE6-related: Implicit transform selection for Multi directional LM, Joint Video Experts Team (JVET) of ITU-T SG 16 WP 3 and ISO/IEC JTC 1/SC 29/WG 11, Document: JVET-M0480-v3, 13th Meeting: Marrakech, MA, Jan. 9-18, 2019.

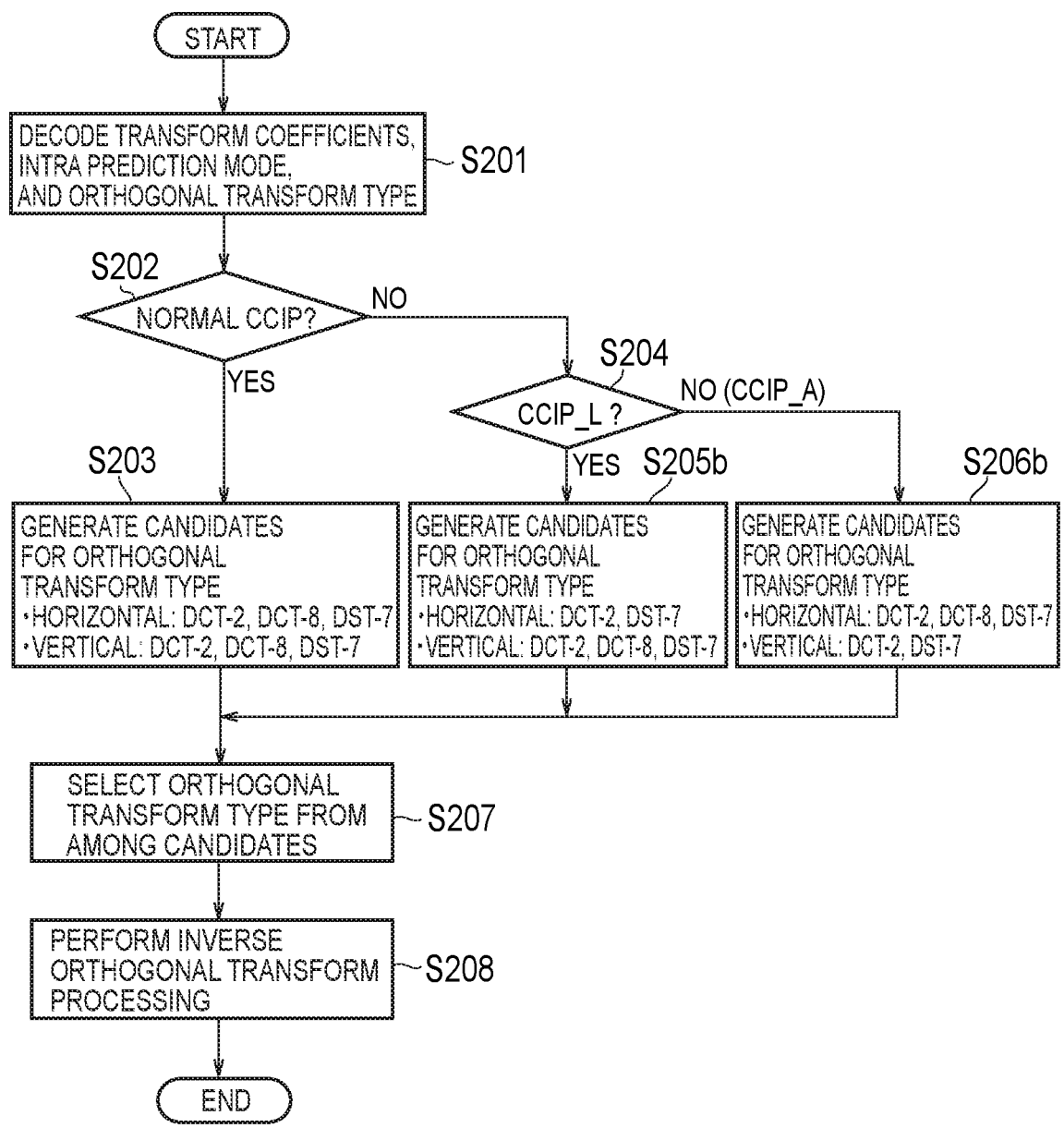

IMAGE ENCODING DEVICE, IMAGE DECODING DEVICE AND PROGRAM

TECHNICAL FIELD

The present invention relates to an image encoding device, an image decoding device and a program.

BACKGROUND ART

In image encoding techniques, intra prediction is widely used, which utilizes spatial correlation in a frame. In intra prediction, a prediction image is generated by referring to neighbouring decoded pixels adjacent to a prediction-target block, and predicting pixel values in the prediction-target block.

An image encoding device calculates prediction residuals that represent errors between the prediction image and the block, generates transform coefficients by performing orthogonal transform processing on the prediction residuals, quantizes and entropy-encodes the transform coefficients, and outputs encoded data (a bit stream).

For example, Patent Literature 1 discloses an image encoding device using the intra predictor being capable of improving encoding efficiency of the intra prediction mode of the chroma signal, in an intra predictor that determines the intra prediction mode for a chroma signal for each block of an image (see Patent Literature 1). Conventionally, DCT type 2 (DCT-2) has widely been used for an orthogonal transform type applied to the orthogonal transform processing.

In HEVC described in Non Patent Literature 1, it is stipulated that not DCT-2 but DST type 7 (DST-7) is applied to a block of a designated size or smaller to which intra prediction is applied. Unlike DCT-2, DST-7 is an orthogonal transformation with asymmetric impulse responses, and is a transformation generating smaller coefficients for end points on one side and larger coefficients for end points on another side.

Since intra prediction predicts a block by referring to neighbouring decoded pixels adjacent to the block, it is highly probable that in the block, prediction accuracy is high in an area close to the neighbouring decoded pixels, and prediction accuracy is low in an area far from the neighbouring decoded pixels. DST-7 is applied to prediction residuals with such characteristics, whereby energy of the prediction residuals can be more efficiently concentrated.

On the other hand, as a mode of intra prediction, cross-component intra prediction (CCIP) is known that predicts chroma pixel values by using neighbouring decoded luminance (luma) pixels.

Specifically, in cross-component intra prediction, decoded luminance pixels and decoded chroma pixels adjacent to a top side and a left side of a chroma block are referred to, a luminance-chroma linear model for the block is calculated, and chroma pixel values in the block are predicted by using the calculated linear model. Note that cross-component intra prediction is also referred to as CCLM (Cross-Component Linear Model) prediction in some cases.

Cross-component intra prediction can predict a chroma signal with high accuracy, by using a fact that a relationship between signal distributions of neighbouring decoded luminance and chroma pixels to the top side and the left side of a block can be approximated to a relationship between luminance and chroma signal distributions in the block. However, since top and left neighbouring decoded pixels are always used, a correct linear model cannot be calculated when a relationship between luminance and chroma signal distributions differs between the top side and the left side, and consequently, chroma prediction accuracy is lowered.

In view of such a problem, Non Patent Literature 2 describes CCIP_A mode and CCIP_L mode as new intra prediction modes for chroma. The CCIP_A mode is an intra prediction mode in which a linear model is calculated by using only top neighbouring decoded luminance and chroma pixels, instead of using top and left neighbouring decoded luminance and chroma pixels. The CCIP_L mode is an intra prediction mode in which a linear model is calculated by using only left neighbouring decoded luminance and chroma pixels. In Non Patent Literature 3, similar intra prediction modes are described and an intra prediction mode corresponding to the CCIP_A mode is referred to as an LM-top mode and an intra prediction mode corresponding to the CCIP_L mode is referred to as an LM-left mode.

Moreover, Non Patent Literature 2 describes that in orthogonal transform processing on prediction residuals of a chroma block to which the CCIP mode, the CCIP_A mode, or the CCIP_L mode is applied, DCT-2 is applied in vertical and horizontal directions, or DCT-8 or DST-7 is selectively applied in each of the vertical and horizontal directions.

CITATION LIST

Patent Literature

Patent Literature 1: Japanese Patent Application Laid-Open No. 2018-078409

Non Patent Literature

Non Patent Literature 1: Recommendation ITU-T H.265, (December 2016), "High efficiency video coding", International Telecommunication Union Non Patent Literature 2: JVET-J0025, "Description of SDR, HDR and 360° video coding technology proposal by Qualcomm and Technicolormedium complexity version", retrieved on May 22, 2018, Internet <URL: http://phenix.it-sudparis.eu/jvet/doc_end_user/documents/10_San%20Diego/wg11/JVET-J0025-v4.zip>

Non Patent Literature 3: JVET-J0018, "Description of SDR video coding technology proposal by MediaTek" retrieved on May 22, 2018, <URL: http://phenix.it-sudparis.eu/jvet/doc_end_user/documents/10_San%20Diego/wg11/JVET-J0018-v2.zip>

DISCLOSURE OF INVENTION

Technical Problem

However, it is highly probable that bias occurs in an energy distribution trend of prediction residuals of a chroma block to which the CCIP_A mode or the CCIP_L mode is applied.

For example, when the CCIP_A mode is applied, since top neighbouring decoded luminance and chroma pixels are used to calculate a linear model, it is highly probable that prediction accuracy is high in an upper-end area of a block of interest. On the other hand, it is highly probable that prediction accuracy is low in a lower-end area that is far from the neighbouring decoded pixels used to calculate the linear model. When DCT-8 is applied in the vertical direction to prediction residuals with such characteristics, a problem arises that encoding efficiency is lowered because energy of the prediction residuals is not concentrated.

Similarly, when the CCIP_L mode is applied, since left neighbouring decoded luminance and chroma pixels are used to calculate a linear model, it is highly probable that prediction accuracy is high in a left-end chroma area of a block of interest, but it is highly probable that prediction accuracy is low in a right-end area that is far from the neighbouring decoded pixels used to calculate the linear model. When DCT-8 is applied in the horizontal direction to prediction residuals with such characteristics, a problem arises that encoding efficiency is lowered because energy of the prediction residuals is not concentrated.

In view of the above, an object of the present invention is to provide image encoding device, image decoding device and program in which encoding efficiency is improved when cross-component intra prediction is used.

Solution to Problem

An image encoding device according to a first feature includes: a cross-component intra predictor configured to generate a predicted block of a second component through cross-component intra prediction in which a block of the second component to be encoded is predicted by referring to, as neighbouring decoded pixels adjacent to the block of the second component, decoded pixels of a first component and decoded pixels of the second component; a candidate generator configured to generate candidates for an orthogonal transform type to be applied to orthogonal transform processing on prediction residuals that represent errors between the predicted block of the second component and the block of the second component; and a transformer configured to perform the orthogonal transform processing on the prediction residuals by using an orthogonal transform type selected from among the candidates generated by the candidate generator, wherein the candidate generator is configured to generate the candidates for the orthogonal transform type, based on positions of the neighbouring decoded pixels referred to in the cross-component intra prediction.

An image decoding device according to a second feature includes: a cross-component intra predictor configured to generate a predicted block of a second component through cross-component intra prediction in which a block of the second component to be decoded is predicted by referring to, as neighbouring decoded pixels adjacent to the block of the second component, decoded pixels of a first component and decoded pixels of the second component; a candidate generator configured to generate candidates for an orthogonal transform type to be applied to inverse orthogonal transform processing on transform coefficients of the second component, the transform coefficients corresponding to prediction residuals that represent errors between the predicted block of the second component and the block of the second component; and an inverse transformer configured to perform the inverse orthogonal transform processing on the transform coefficients of the second component by using an orthogonal transform type selected from among the candidates generated by the candidate generator, wherein the candidate generator is configured to generate the candidates for the orthogonal transform type, based on positions of the neighbouring decoded pixels referred to in the cross-component intra prediction.

A program according to a third feature causes a computer to function as the image encoding device according to the first feature.

A program according to a fourth feature causes a computer to function as the image decoding device according to the second feature.

Advantageous Effect of Invention

According to the present invention, an image encoding device, an image decoding device, and a program can be provided that achieve improved encoding efficiency when cross-component intra prediction is used.

BRIEF DESCRIPTION OF DRAWINGS

FIG. 11 illustrates an example of operation of the image decoding device according to the modified example 2 of the embodiment.

DESCRIPTION OF EMBODIMENTS

An image encoding device and an image decoding device according to a present embodiment of the invention are described with reference to the accompanying drawings. The image encoding device and the image decoding device according to the present embodiment encode and decode videos such as MPEG videos. In the description of the drawings below, the same or similar reference signs are used for the same or similar parts.

1. Configuration of Image Encoding Device

Figure 1:
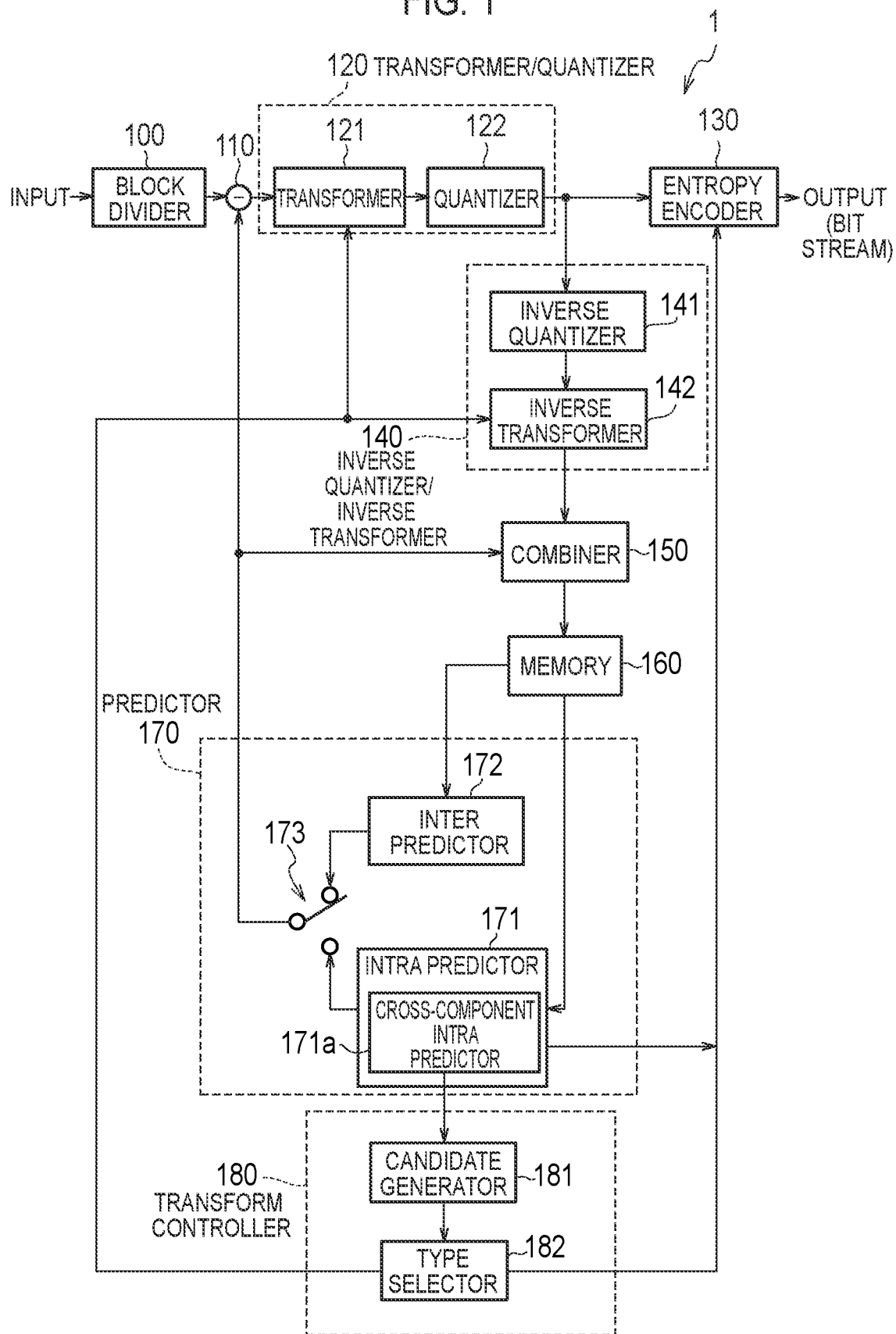
FIG. 1 is a diagram illustrating a configuration of an image encoding device according to an embodiment.

FIG. 1 is a diagram illustrating a configuration of the image encoding device 1 according to the present embodiment.

As illustrated in FIG. 1, the image encoding device 1 includes a block divider 100, a subtractor 110, a transformer/quantizer 120, an entropy encoder 130, an inverse quantizer/inverse transformer 140, a combiner 150, a memory 160, a predictor 170, and a transform controller 180.

The block divider 100 divides an input image given in the form of a frame (or a picture) that constitutes a part of a video into sub-areas in the form of blocks and outputs the resulting blocks to the subtractor 110. Each pixel of the input image includes a luminance (Y) and a chroma ($C_b$, $C_r$).

The size of the blocks may be 32×32 pixels, 16×16 pixels, 8×8 pixels, or 4×4 pixels. The shape of the blocks is not limited to square and may be rectangular. A block is the unit of encoding by the image encoding device 1 and of decoding by the image decoding device 2.

In the present embodiment, the block divider 100 divides an input image into blocks called CU (Coding Unit). One CU includes a luminance block and chroma blocks. The image encoding device 1 can individually encode the luminance block and the chroma blocks included in one CU. Similarly, the image decoding device 2 can individually decode the luminance block and the chroma blocks included in one CU.

The subtractor 110 calculates prediction residuals that represent errors in units of pixels between a block inputted from the block divider 100 and a prediction image (predicted block) obtained by the predictor 170 predicting the block. Specifically, the subtractor 110 calculates a prediction residual by subtracting each pixel value in the prediction image from each pixel value in the block inputted from the block divider 100, and outputs the calculated prediction residuals to the transformer/quantizer 120.

The transformer/quantizer 120 executes an orthogonal transform process and a quantization process on each of blocks. The transformer/quantizer 120 includes a transformer 121 and a quantizer 122.

The transformer 121, under control of the transform controller 180, calculates transform coefficients by performing orthogonal transform processing on the prediction residuals inputted from the subtractor 110, and outputs the calculated transform coefficients to the quantizer 122. The orthogonal transform processing is, for example, discrete cosine transformation (DCT), discrete sine transformation (DST), Karhunen-Loeve transformation (KLT), or the like.

In the present embodiment, the transformer 121 performs orthogonal transform processing in each of a horizontal direction and a vertical direction by using an orthogonal transform type selected by the transform controller 180 from among DCT type 2 (DCT-2), DCT type 5 (DCT-5), DCT type 8 (DCT-8), and DST type 7 (DST-7). Since these orthogonal transform types are well known to those skilled in the art, a description of mathematical expressions and the like of each orthogonal transform type is omitted.

The quantizer 122 generates quantized transform coefficients by quantizing the transform coefficients inputted from the transformer 121 by using a quantization parameter (Qp) and a quantization matrix. The quantization parameter (Qp) is a parameter that is applied in common to each transform coefficient in a block, and is a parameter that determines quantization granularity. The quantization matrix is a matrix that has, as elements, quantization values used when each transform coefficient is quantized. The quantizer 122 outputs the quantized transform coefficients to the entropy encoder 130 and the inverse quantizer/inverse transformer 140.

The entropy encoder 130 performs entropy encoding on the transform coefficients inputted from the quantizer 122, generates encoded data (a bit stream) by performing data compression, and outputs the encoded data to an outside of the image encoding device 1. For the entropy encoding, Huffman coding, CABAC (Context-based Adaptive Binary Arithmetic Coding), or the like can be used.

Note that into the entropy encoder 130, control information related to prediction is inputted from the predictor 170, and control information related to transform processing is inputted from the transform controller 180. The entropy encoder 130 also performs entropy encoding of such control information.

The inverse quantizer/inverse transformer 140 executes an inverse quantization process and an inverse orthogonal transform process on each of blocks. The inverse quantizer/inverse transformer 140 includes an inverse quantizer 141 and an inverse transformer 142.

The inverse quantizer 141 performs the inverse quantization process corresponding to the quantization process performed by the quantizer 122. More specifically, the inverse quantizer 141 inverse quantizes quantized transform coefficients input from the quantizer 122 using the quantization parameter (Qp) and the quantization matrix to restore the transform coefficients and outputs the restored transform coefficients to the inverse transformer 142.

The inverse transformer 142, under control of the transform controller 180, performs inverse orthogonal transform processing corresponding to the orthogonal transform processing performed by the transformer 121. For example, when the transformer 121 performs orthogonal transform processing using DCT-2, the inverse transformer 142 performs inverse orthogonal transform processing using DCT-2. The inverse transformer 142 restores prediction residuals by performing inverse orthogonal transform processing in each of the horizontal direction and the vertical direction on the transform coefficients inputted from the inverse quantizer 141, and outputs the restored prediction residuals to the combiner 150.

The combiner 150 combines the restored prediction residuals inputted from the inverse transformer 142 with a prediction image inputted from the predictor 170, on a pixel-by-pixel basis. The combiner 150 reconstructs (decodes) a block by adding individual pixel values of the restored prediction residuals to individual pixel values of the prediction image, and outputs a decoded image on each of decoded blocks to the memory 160. A decoded image is referred to as a reconstructed image in some cases. A loop filter may be provided between the combiner 150 and the memory 160.

The memory 160 stores the decoded image inputted from the combiner 150. The memory 160 stores decoded images in units of frames.

The predictor 170 performs prediction on each of blocks. The predictor 170 includes an intra predictor 171, an inter predictor 172 and a switch 173.

The intra predictor 171 performs intra prediction on each of blocks obtained by dividing each original image in a unit of a frame. The intra predictor 171 generates an intra prediction image by referring to neighbouring decoded pixels adjacent to a prediction-target block of a decoded image stored in the memory 160, and outputs the generated intra prediction image to the switcher 173.

The intra predictor 171 selects an optimal intra prediction mode to be applied to the target block from among a plurality of intra prediction modes, and performs intra prediction by using the selected intra prediction mode. The intra predictor 171 outputs an index indicating the selected intra prediction mode to the entropy encoder 130. Note that intra prediction modes include planar prediction, DC prediction, directional prediction, and the like.

The intra predictor 171 can select cross-component intra prediction (CCIP) as an intra prediction mode to be applied to a chroma block of a prediction-target CU. Specifically, the intra predictor 171 includes a cross-component intra predictor 171a configured to predict a chroma block of a CU through CCIP by using a decoded image (decoded pixel values) of a luminance block of the CU.

Specifically, the cross-component intra predictor 171a generates a predicted chroma block through cross-component intra prediction in which a chroma block to be encoded is predicted by referring to, as the neighbouring decoded pixels adjacent to the chroma block, decoded luminance pixels and decoded chroma pixels.

Note that when cross-component intra prediction (CCIP) is applied, the intra predictor 171 first performs intra prediction of a luminance block of a CU, and a decoded image of the luminance block of the CU is stored in the memory 160.

The cross-component intra predictor 171a generates the predicted chroma block through cross-component intra prediction (CCIP), and outputs the predicted chroma block to the subtractor 110 via the switcher 173. The subtractor 110 calculates chroma prediction residuals that represent errors between the predicted chroma block and the chroma block inputted from the block divider 100, and outputs the calculated chroma prediction residuals to the transformer 121. The transformer 121 performs orthogonal transform processing on the chroma prediction residuals inputted from the subtractor 110.

Figure 2:
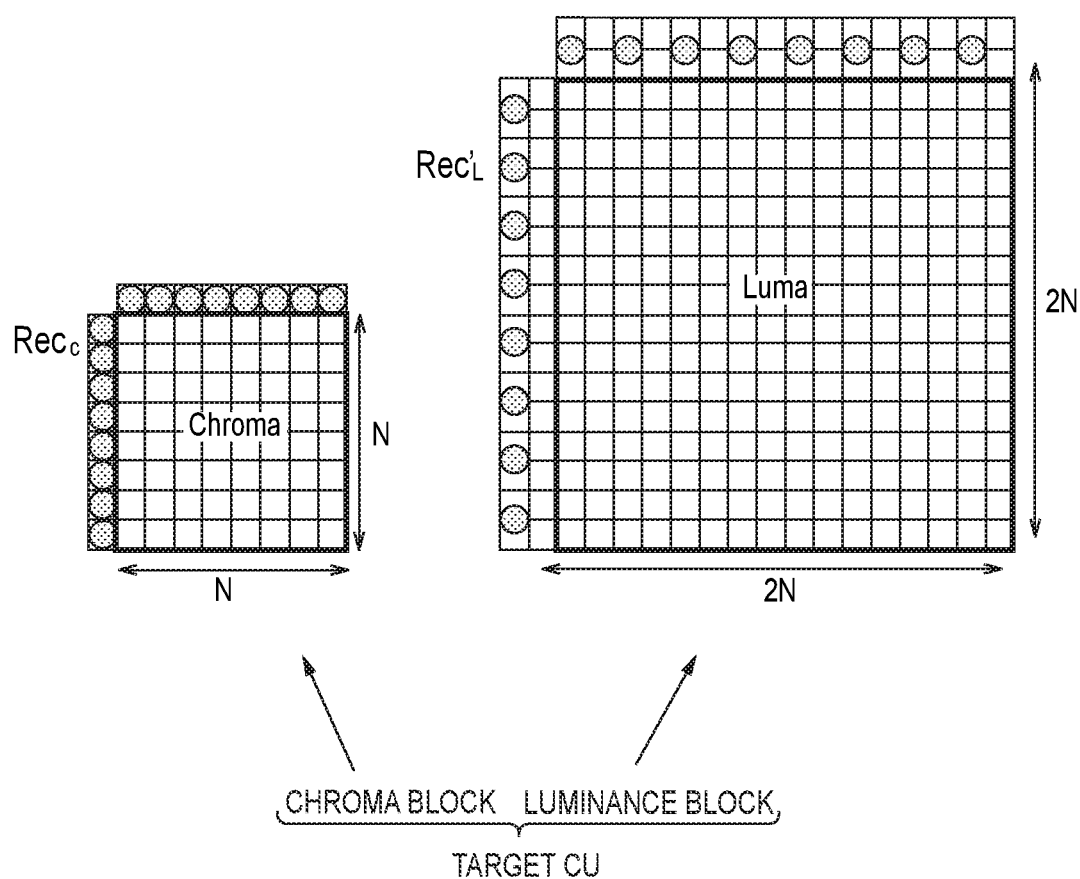
FIG. 2 is a diagram illustrating the normal CCIP mode.
Figure 3:
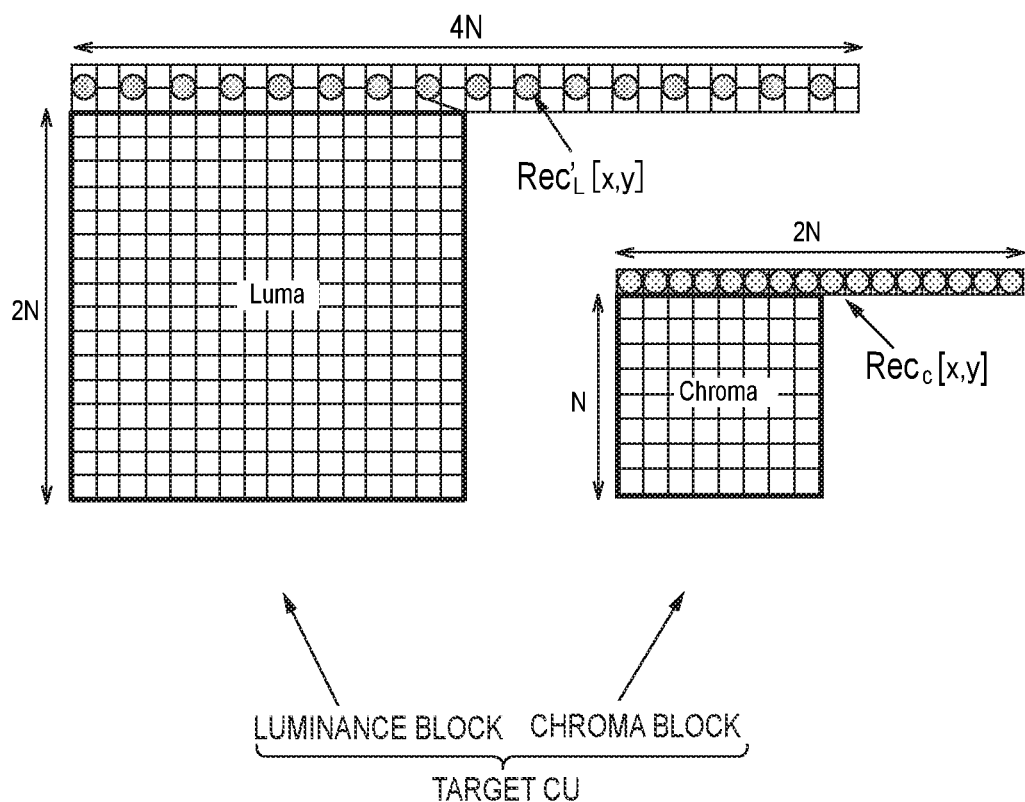
FIG. 3 is a diagram illustrating the CCIP_A mode.
Figure 4:
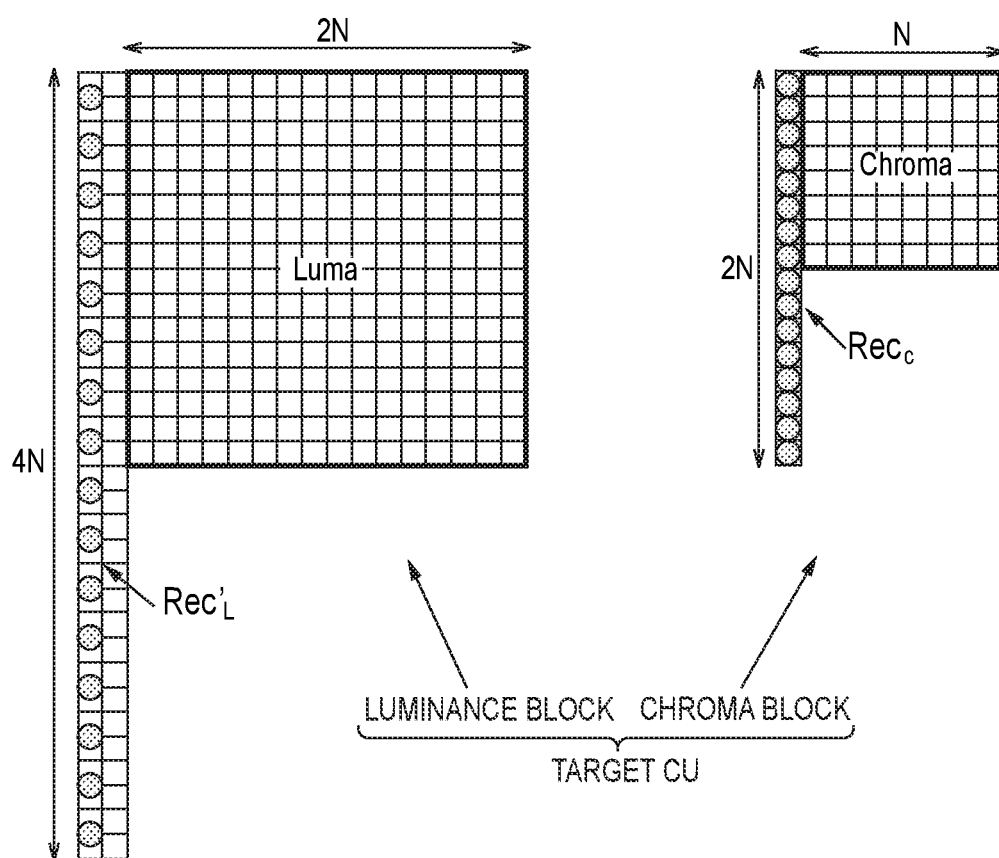
FIG. 4 is a diagram illustrating the CCIP_L mode.

In the present embodiment, CCIP includes the following three modes: normal CCIP, CCIP_A and CCIP_L. FIG. 2 is a diagram illustrating the normal CCIP mode, FIG. 3 is a diagram illustrating the CCIP_A mode, and FIG. 4 is a diagram illustrating the CCIP_L mode.

As illustrated in FIG. 2, in a case of the normal CCIP mode, the cross-component intra predictor 171a calculates a luminance-chroma linear model for a CU by using decoded luminance pixels and decoded chroma pixels adjacent to the top side and the left side of the CU, and predicts pixel values of a chroma block of the CU by using the calculated linear model.

In the normal CCIP mode, a chroma signal can be predicted with high accuracy by using a fact that a relationship between signal distributions of neighbouring decoded luminance and chroma pixels to the top side and the left side of a CU can be approximated to a relationship between luminance and chroma signal distributions in the CU. Note that a concept of neighbouring decoded pixels may include next neighbouring decoded pixels.

As described in, for example, JVET-G1001-V1 and the like as well as in Non Patent Literatures cited above, the cross-component intra predictor 171a calculates predicted chroma ($C_b$) pixel values $pred_C(i, j)$ of a CU, based on a following expression (1).

$$pred_C(i,j) = \alpha \cdot rec_L'(i,j) + \beta \quad \text{[Expression 1]}$$

where $rec_L'(i, j)$ represents downsampled decoded luminance pixel values (downsampled reconstructed luma samples) of the CU.

$\alpha$ and $\beta$ are calculated by the following expressions (2) and (3).

[Expression 2]

$$\alpha = \frac{N \cdot \Sigma(L(n) \cdot C(n)) - \Sigma L(n) \cdot \Sigma C(n)}{N \cdot \Sigma(L(n) \cdot L(n)) - \Sigma L(n) \cdot \Sigma L(n)} \quad (2)$$

$$\beta = \frac{\Sigma C(n) - \alpha \cdot \Sigma L(n)}{N} \quad (3)$$

where L(n) represents downsampled top and left neighbouring decoded luminance pixel values (top and left neighbouring reconstructed luma samples). C(n) represents top and left neighbouring decoded chroma pixel values (top and left neighbouring reconstructed chroma samples).

As described above, in the normal CCIP, since neighbouring decoded pixels to the top side and the left side of a CU are always used, a correct linear model cannot be calculated when a relationship between luminance and chroma signal distributions differs between the top side and left side, and consequently, chroma prediction accuracy is lowered. The CCIP_A mode and the CCIP_L mode are preferred modes in a case where the relationship between luminance and chroma signal distributions differs between the top side and left side of a CU.

As illustrated in FIG. 3, in a case of the CCIP_A mode, the cross-component intra predictor 171a calculates a linear model by using neighbouring decoded luminance and chroma pixels only to the top side of a CU, instead of using neighbouring decoded luminance and chroma pixels to the top side and the left side of a CU.

When the CCIP_A mode is applied, it is highly probable that prediction accuracy is high in an area close to the neighbouring decoded pixels used to calculate the linear model (that is, an upper-end area of a chroma block). On the other hand, it is highly probable that prediction accuracy is low in an area far from the neighbouring decoded pixels used to calculate the linear model (that is, a lower-end area of the chroma block).

As illustrated in FIG. 4, in a case of the CCIP_L mode, the cross-component intra predictor 171a calculates a linear model by using neighbouring decoded luminance and chroma pixels only to the left side of a CU, instead of using neighbouring decoded luminance and chroma pixels to the top side and the left side of a CU.

When the CCIP_L mode is applied, it is highly probable that prediction accuracy is high in an area near the neighbouring decoded pixels used to calculate the linear model (that is, a left-end area of a chroma block), and it is highly probable that prediction accuracy is low in an area far from the neighbouring decoded pixels used to calculate the linear model (that is, a right-end area of the chroma block).

When any one of the normal CCIP mode, the CCIP_A mode, and the CCIP_L mode is selected as an intra prediction mode to be applied to a chroma block, the cross-component intra predictor 171a outputs an index indicating the selected mode to the entropy encoder 130 and the transform controller 180.

The inter predictor 172 calculates a motion vector through a scheme such as block matching by using, for a reference image, a decoded image stored in the memory 160, generates an inter prediction image by predicting a prediction-target block, and outputs the generated inter prediction image to the switcher 173. The inter predictor 172 selects an optimal inter prediction method, from inter prediction using a plurality of reference images (typically, bi-prediction) and inter prediction using one reference image (uni-directional prediction), and performs inter prediction by using the selected inter prediction method.

The switcher 173 switches between the intra prediction image inputted from the intra predictor 171 and the inter prediction image inputted from the inter predictor 172, and outputs any one of the prediction images to the subtractor 110 and the combiner 150.

The transform controller 180 controls the orthogonal transform processing performed by the transformer 121 and the inverse orthogonal transform processing performed by the inverse transformer 142. In the present embodiment, when any one of the normal CCIP mode, the CCIP_A mode, and the CCIP_L mode is selected as an intra prediction mode to be applied to a chroma block, the transform controller 180 controls transform processing (orthogonal transform processing and inverse orthogonal transform processing) that deals with the chroma block.

The transform controller 180 includes a candidate generator 181 and a type selector 182.

The candidate generator 181 generates candidates for an orthogonal transform type to be applied to orthogonal transform processing on chroma prediction residuals, based on the index of the intra prediction mode inputted from the cross-component intra predictor 171a, and outputs the generated candidates to the type selector 182. For example, the candidates for the orthogonal transform type include at least one of DCT-2, DCT-5, DCT-8, and DST-7.

Specifically, the candidate generator 181 generates the candidates for the orthogonal transform type, depending on whether or not positions of the neighbouring decoded pixels referred to in cross-component intra prediction (CCIP) are to only any one of a top, a bottom, a left, and a right of a chroma block.

In the present embodiment, the cross-component intra predictor 171a performs cross-component intra prediction by using a mode selected from among a plurality of modes including a first mode (normal CCIP mode) and a second mode (CCIP_A mode or CCIP_L mode). The first mode is a mode in which a chroma block is predicted by referring to neighbouring decoded pixels to both the top side and the left side of the chroma block. The second mode is a mode in which a chroma block is predicted by referring to neighbouring decoded pixels only to the top side or the left side of the chroma block.

When the first mode is selected, the candidate generator 181 generates first candidates that include one or more orthogonal transform types, as the candidates for the orthogonal transform type. When the second mode is selected, the candidate generator 181 generates second candidates that are different from the first candidates, as the candidates for the orthogonal transform type. In other words, the candidate generator 181 generates the candidates for the orthogonal transform type that differ between the first mode (normal CCIP mode) and the second mode (CCIP_A mode or CCIP_L mode).

Here, the first candidates and the second candidates each include horizontal-direction candidates that are one or more candidates for an orthogonal transform type to be applied to transform processing in the horizontal direction, and vertical-direction candidates that are one or more candidates for an orthogonal transform type to be applied to transform processing in the vertical direction. In the first candidates, the horizontal-direction candidates and the vertical-direction candidates may be identical. On the other hand, in the second candidates, the horizontal-direction candidates and the vertical-direction candidates are different from each other.

The type selector 182 selects, from among the candidates inputted from the candidate generator 181, orthogonal transform types to be applied to orthogonal transform processing on the chroma prediction residuals, and outputs an index (flag) indicating the selected orthogonal transform types to the transformer 121, the inverse transformer 142, and the entropy encoder 130. For example, the type selector 182 may calculate an RD (Rate Distortion) cost for each candidate inputted from the candidate generator 181, and may select an orthogonal transform type or types from among the candidates, based on the calculated RD costs.

Specifically, the type selector 182 selects an orthogonal transform type to be applied to transform processing in the horizontal direction from among the horizontal-direction candidates inputted from the candidate generator 181, and outputs an index (flag) indicating the selected orthogonal transform type in the horizontal direction to the transformer 121, the inverse transformer 142, and the entropy encoder 130.

However, when the horizontal-direction candidates inputted from the candidate generator 181 include only one orthogonal transform type, the index (flag) indicating the orthogonal transform type in the horizontal direction need not be outputted to the entropy encoder 130 because an orthogonal transform type to be applied to transform processing in the horizontal direction is uniquely determined.

Moreover, the type selector 182 selects an orthogonal transform type to be applied to transform processing in the vertical direction from among the vertical-direction candidates inputted from the candidate generator 181, and outputs an index (flag) indicating the selected orthogonal transform type in the vertical direction to the transformer 121, the inverse transformer 142, and the entropy encoder 130.

However, when the vertical-direction candidates inputted from the candidate generator 181 include only one orthogonal transform type, the index (flag) indicating the orthogonal transform type in the vertical direction need not be outputted to the entropy encoder 130 because an orthogonal transform type to be applied to transform processing in the vertical direction is uniquely determined.

2. Configuration of Image Decoding Device

Figure 5:
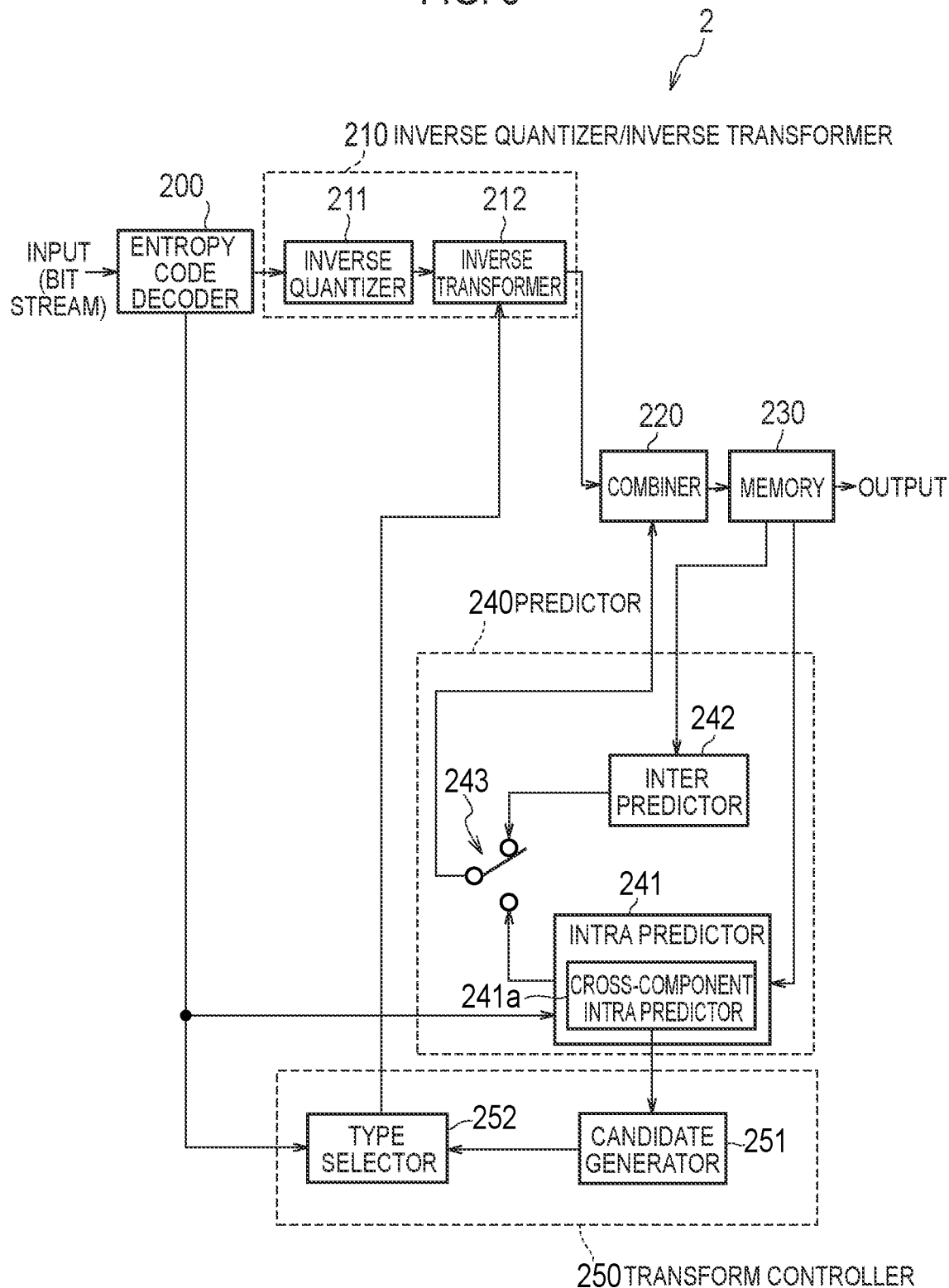
FIG. 5 is a diagram illustrating a configuration of an image decoding device according to the embodiment.

FIG. 5 illustrates the configuration of an image decoding device 2 according to the present embodiment.

As illustrated in FIG. 5, the image decoding device 2 includes an entropy code decoder 200, an inverse quantizer/inverse transformer 210, a combiner 220, a memory 230, a predictor 240, and a transform controller 250.

The entropy code decoder 200 decodes encoded data generated by the image encoding device 1, and outputs quantized transform coefficients to the inverse quantizer/inverse transformer 210. Moreover, the entropy code decoder 200 acquires control information related to prediction (intra prediction and inter prediction), and outputs the acquired control information to the predictor 240.

In the present embodiment, the entropy code decoder 200 acquires an index of an intra prediction mode (specifically, a mode of CCIP) and an index of an orthogonal transform type in each of the horizontal direction and the vertical direction, outputs the index of the intra prediction mode to an intra predictor 241 and a type selector 252, and outputs the index of the orthogonal transform types to the type selector 252.

The inverse quantizer/inverse transformer 210 performs inverse quantization processing and inverse orthogonal transform processing on each of blocks. The inverse quantizer/inverse transformer 210 includes an inverse quantizer 211 and an inverse transformer 212.

The inverse quantizer 211 performs the inverse quantization process corresponding to the quantization process performed by the quantizer 122 of the image encoding device 1. The inverse quantizer 211 inverse quantizes quantized transform coefficients input from the entropy code decoder 200 using the quantization parameter (Qp) and the quantization matrix to restore the transform coefficients and outputs the restored transform coefficients to the inverse transformer 212.

The inverse transformer 212, under control of the transform controller 250, performs inverse orthogonal transform processing corresponding to orthogonal transform processing performed by the transformer 121 of the image encoding device 1. The inverse transformer 212 restores prediction residuals by performing inverse orthogonal transform processing in each of the horizontal direction and the vertical direction on the transform coefficients inputted from the inverse quantizer 211, and outputs the restored prediction residuals to the combiner 220.

The combiner 220 reconstructs (decodes) an original block by combining the prediction residuals inputted from the inverse transformer 212 and a prediction image (predicted block) inputted from predictor 240 on a pixel-by-pixel basis, and outputs a decoded image on each of blocks to the memory 230. Note that a loop filter may be provided between the combiner 220 and the memory 230.

The memory 230 stores the decoded image inputted from the combiner 220. The memory 230 stores decoded images in units of frames. The memory 230 outputs the decoded images in units of frames to an outside of the image decoding device 2.

The predictor 240 performs prediction on each of blocks. The predictor 240 includes the intra predictor 241, an inter predictor 242, and a switcher 243.

The intra predictor 241 generates an intra prediction image by referring to neighbouring decoded pixels adjacent to a prediction-target block of a decoded image stored in the memory 230, and outputs the generated intra prediction image to the switcher 243. Moreover, the intra predictor 241 selects an intra prediction mode from among a plurality of intra prediction modes, based on the index of the intra prediction mode inputted from the entropy code decoder 200, and performs intra prediction by using the selected intra prediction mode.

The intra predictor 241 includes a cross-component intra predictor 241a configured to predict a chroma block of a CU through cross-component intra prediction (CCIP) by using a decoded image (decoded pixel values) of a luminance block of the CU. Specifically, the cross-component intra predictor 241a generates a predicted chroma block through cross-component intra prediction in which a chroma block to be decoded is predicted by referring to, as the neighbouring decoded pixels adjacent to the chroma block, decoded luminance pixels and decoded chroma pixels.

Note that when cross-component intra prediction (CCIP) is applied, the intra predictor 241 first performs intra prediction of a luminance block of a CU, and a decoded image of the luminance block of the CU is stored in the memory 230.

The cross-component intra predictor 241a generates the predicted chroma block through cross-component intra prediction (CCIP), and outputs the predicted chroma block to the combiner 220 via the switcher 243. The combiner 220 reconstructs (decodes) an original chroma block by combining the chroma prediction residuals inputted from the inverse transformer 212 and the predicted chroma block inputted from the cross-component intra predictor 241a on a pixel-by-pixel basis, and outputs a decoded image on each of blocks to the memory 230.

In the present embodiment, CCIP includes three modes, namely, normal CCIP, CCIP_A, and CCIP_L. When any one of the normal CCIP mode, the CCIP_A mode, and the CCIP_L mode is selected as an intra prediction mode to be applied to a chroma block, the cross-component intra predictor 241a outputs an index indicating the selected mode to the transform controller 250.

The inter predictor 242 performs inter prediction that predicts a prediction-target block by using, for a reference image, a decoded image stored in the memory 230. The inter predictor 242 generates an inter prediction image by performing inter prediction in accordance with control information (motion vector information and the like) inputted from the entropy code decoder 200, and outputs the generated inter prediction image to the switcher 243.

The switcher 243 switches between the intra prediction image inputted from the intra predictor 241 and the inter prediction image inputted from the inter predictor 242, and outputs any one of the prediction images to the combiner 220.

The transform controller 250 controls inverse orthogonal transform processing performed by the inverse transformer 212. In the present embodiment, when any one of the normal CCIP mode, the CCIP_A mode, and the CCIP_L mode is selected as an intra prediction mode to be applied to a chroma block, the transform controller 250 controls transform processing (inverse orthogonal transform processing) that deals with the chroma block. The transform controller 250 includes a candidate generator 251 and the type selector 252.

The candidate generator 251 generates candidates for an orthogonal transform type to be applied to inverse orthogonal transform processing performed by the inverse transformer 212, based on the index of the intra prediction mode inputted from the cross-component intra predictor 241a, and outputs the generated candidates to the type selector 252. For example, the candidates for the orthogonal transform type include at least one of DCT-2, DCT-5, DCT-8, and DST-7.

Specifically, the candidate generator 251 generate the candidates for the orthogonal transform type, depending on whether or not positions of the neighbouring decoded pixels referred to in cross-component intra prediction (CCIP) are to only any one of the top, the bottom, the left, and the right of a chroma block.

In the present embodiment, the cross-component intra predictor 241a performs cross-component intra prediction by using a mode selected from among a plurality of modes including the first mode (normal CCIP mode) and the second mode (CCIP_A mode or CCIP_L mode). The first mode is a mode in which a chroma block is predicted by referring to neighbouring decoded pixels to both the top side and the left side of the chroma block. The second mode is a mode in which a chroma block is predicted by referring to neighbouring decoded pixels only to the top side or the left side of the chroma block.

When the first mode is selected, the candidate generator 251 generates first candidates including one or more orthogonal transform types, as the candidates for the orthogonal transform type. When the second mode is selected, the candidate generator 251 generates second candidates that are different from the first candidates, as the candidates for the orthogonal transform type. In other words, the candidate generator 251 generates the candidates for the orthogonal transform type that differ between the first mode (normal CCIP mode) and the second mode (CCIP_A mode or CCIP_L mode).

Here, the first candidates and the second candidates each include horizontal-direction candidates that are one or more candidates for an orthogonal transform type to be applied to transform processing in the horizontal direction, and vertical-direction candidates that are one or more candidates for an orthogonal transform type to be applied to transform processing in the vertical direction. In the first candidates, the horizontal-direction candidates and the vertical-direction candidates may be identical. On the other hand, in the second candidates, the horizontal-direction candidates and the vertical-direction candidates are different from each other.

The type selector 252 selects orthogonal transform types to be applied to inverse orthogonal transform processing (in the horizontal direction, the vertical direction) from among the candidates inputted from the candidate generator 251, in accordance with the index of the orthogonal transform types (in the horizontal direction, the vertical direction) inputted from the entropy code decoder 200. Specifically, the index of the orthogonal transform types inputted from the entropy code decoder 200 specifies any of the candidates generated by the candidate generator 251. The type selector 252 outputs an index (flag) indicating the selected orthogonal transform types to the inverse transformer 212.

3. Operation Examples

Hereinafter, examples of operation of the image encoding device 1 and the image decoding device 2 according to the present embodiment will be described.

<3.1. Example of Operation of Image Encoding Device>

Figure 6:
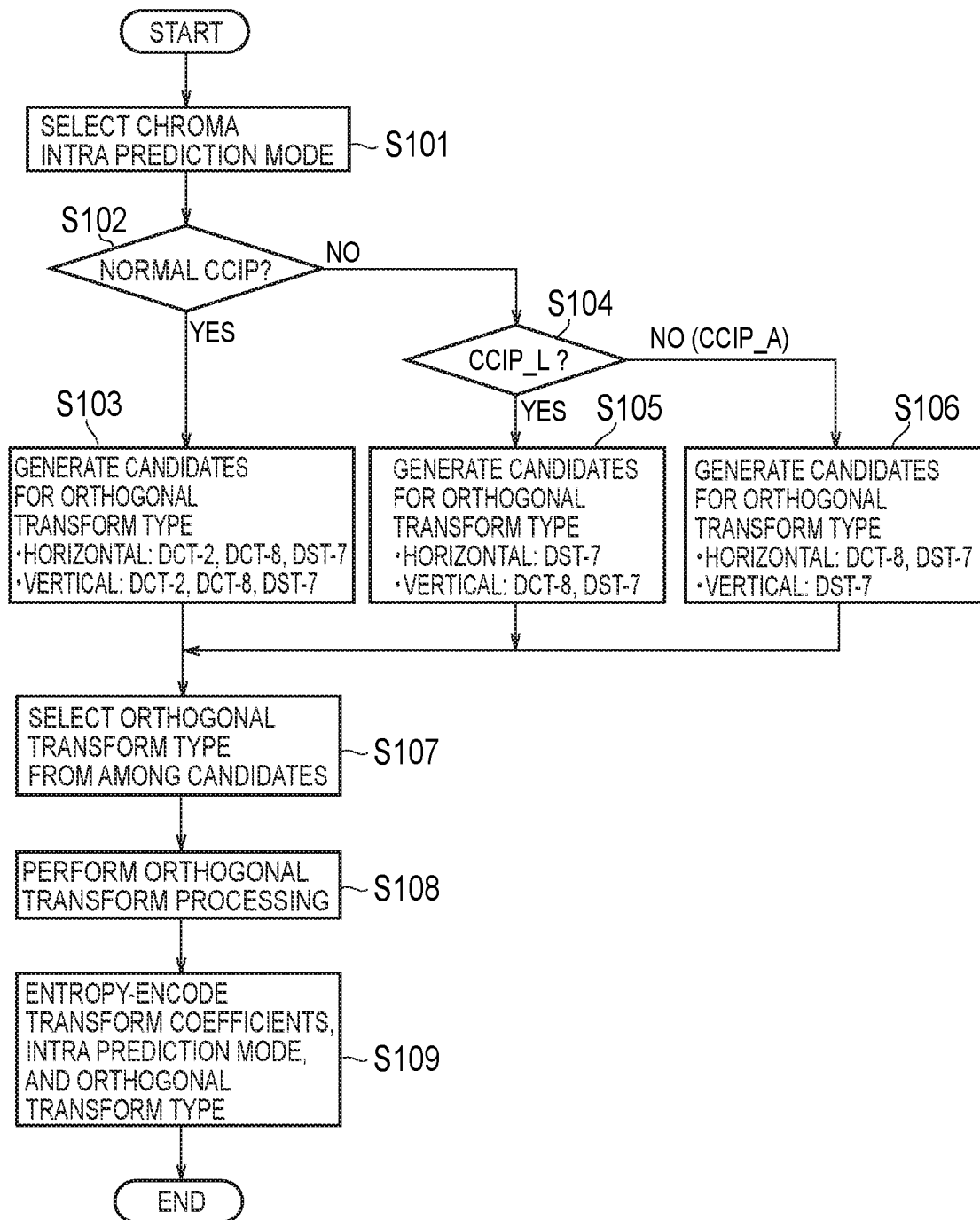
FIG. 6 illustrates an example of operation of the image encoding device according to the embodiment.

FIG. 6 illustrates an example of operation of the image encoding device 1 according to the present embodiment.

As illustrated in FIG. 6, in step S101, the intra predictor 171 selects an intra prediction mode for a chroma block. Here, a description will be continued, assuming that any one of the normal CCIP mode, the CCIP_A mode, and the CCIP_L mode is selected. The cross-component intra predictor 171a performs cross-component intra prediction according to the selected mode, and generates a predicted chroma block. The subtractor 110 calculates chroma prediction residuals that represent errors between the original chroma block and the predicted chroma block.

(Normal CCIP Mode)

When the normal CCIP mode is selected (step S102: YES), in step S103, the candidate generator 181 generates candidates including DCT-2, DCT-8, and DST-7, as horizontal-direction candidates. The candidate generator 181 generates candidates including DCT-2, DCT-8, and DST-7, as vertical-direction candidates.

In step S107, the type selector 182 determines whether to apply DCT-2 in the vertical direction and the horizontal direction, or to selectively apply DCT-8 or DST-7 in each of the vertical direction and the horizontal direction.

In step S108, the transformer 121 generates transform coefficients by performing orthogonal transform processing (in the horizontal direction, the vertical direction) on the chroma prediction residuals, by using the orthogonal transform type or types selected by the type selector 182.

In step S109, the entropy encoder 130 encodes the transform coefficients that are quantized and an index indicating the normal CCIP mode.

Moreover, in step S109, the entropy encoder 130 encodes an index indicating the selected orthogonal transform type or types. For example, the index includes a first flag and a second flag. Specifically, when DCT-2 is applied in the horizontal direction and the vertical direction, the first flag is set to "1", and then encoded and transmitted. When DCT-8 or DST-7 is selectively applied in each of the vertical direction and the horizontal direction, the first flag is set to "0", and then encoded and transmitted, and thereafter the second flag indicating which one of DCT-8 and DST-7 is applied as the orthogonal transform type in the horizontal direction is encoded and outputted in a bit stream. Similarly, the second flag indicating which one of DCT-8 and DST-7 is applied as the orthogonal transform type in the vertical direction is encoded and outputted in a bit stream.

(CCIP_L Mode)

When the CCIP_L mode is selected (step S104: YES), in step S105, the candidate generator 181 generates a candidate including only DST-7, as a horizontal-direction candidate. The candidate generator 181 generates candidates including DCT-8 and DST-7, as vertical-direction candidates. As described above, when the CCIP_L mode is applied to a chroma block, energy in a left-side area of prediction residuals tends to be smaller, and energy in a right-side area of the prediction residuals tends to be larger. Accordingly, the candidate generator 181 is configured to generate a candidate including only DST-7, as a horizontal-direction candidate.

In step S107, the type selector 182 selects any one of DCT-8 and DST-7 for the vertical direction. As for the horizontal direction, since DST-7 is the only candidate, the type selector 182 selects DST-7 for the horizontal direction.

In step S108, the transformer 121 generates transform coefficients by performing orthogonal transform processing (in the horizontal direction, the vertical direction) on the chroma prediction residuals, by using the orthogonal transform types selected by the type selector 182.

In step S109, the entropy encoder 130 encodes the transform coefficients that are quantized and an index indicating the CCIP_L mode.

Moreover, in step S109, the entropy encoder 130 encodes an index indicating the selected orthogonal transform types. However, since there is only one orthogonal transform candidate in the horizontal direction, the entropy encoder 130 does not entropy-encode a flag indicating the orthogonal transform type to be applied in the horizontal direction, and entropy-encodes flags (the first flag and the second flag described above) indicating the orthogonal transform type to be applied in the vertical direction. Since entropy encoding of the flag indicating the orthogonal transform type to be applied in the horizontal direction is not required, the number of flags transmitted to the image decoding device 2 can be reduced.

(CCIP_A Mode)

When the CCIP_A mode is selected (step S104: NO), in step S106, the candidate generator 181 generates a candidate including only DST-7, as a vertical-direction candidate. The candidate generator 181 generates candidates including DCT-8 and DST-7, as horizontal-direction candidates. As described above, when the CCIP_A mode is applied to a chroma block, energy in a top-side area of prediction residuals tends to be smaller, and energy in a bottom-side area of the prediction residuals tends to be lager. Accordingly, the candidate generator 181 is configured to generate a candidate including only DST-7, as a vertical-direction candidate.

In step S107, the type selector 182 selects any one of DCT-8 and DST-7 for the horizontal direction. As for the vertical direction, since DST-7 is the only candidate, the type selector 182 selects DST-7 for the horizontal direction.

In step S108, the transformer 121 generates transform coefficients by performing orthogonal transform processing (in the horizontal direction, the vertical direction) on the chroma prediction residuals, by using the orthogonal transform types selected by the type selector 182.

In step S109, the entropy encoder 130 encodes the transform coefficients that are quantized and an index indicating the CCIP_A mode.

Moreover, in step S109, the entropy encoder 130 encodes an index indicating the selected orthogonal transform types. However, since there is only one orthogonal transform candidate in the vertical direction, the entropy encoder 130 does not entropy-encode a flag indicating the orthogonal transform type to be applied in the vertical direction, and entropy-encodes flags (the first flag and the second flag described above) indicating the orthogonal transform type to be applied in the horizontal direction. Since entropy encoding of the flag indicating the orthogonal transform type to be applied in the vertical direction is not required, the number of flags transmitted to the image decoding device 2 can be reduced.

<3.2. Example of Operation of Image Decoding Device>

Figure 7:
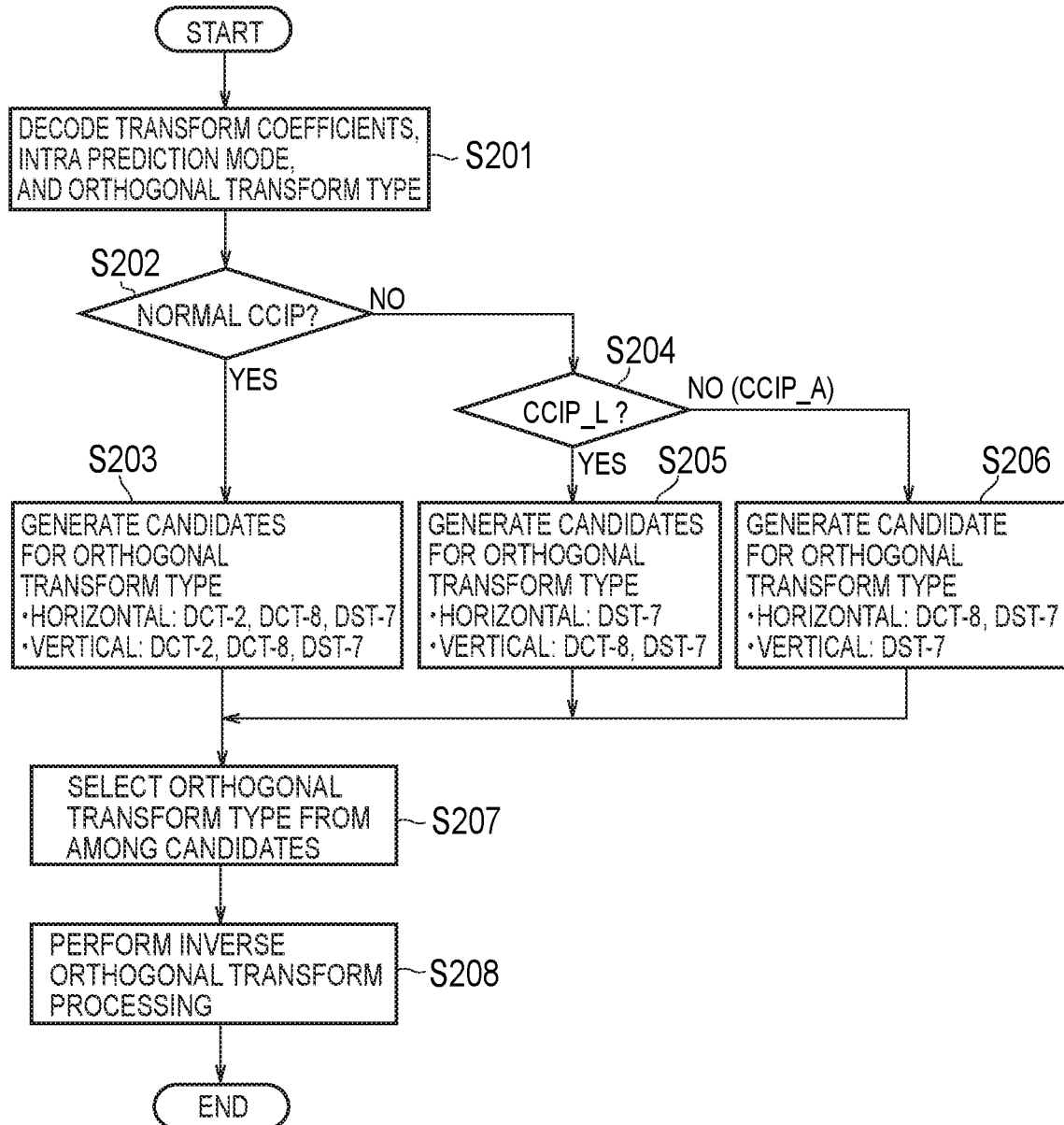
FIG. 7 illustrates an example of operation of the image decoding device according to the embodiment.

FIG. 7 illustrates an example of operation of the image decoding device 2 according to the present embodiment.

As illustrated in FIG. 7, in step S201, the entropy code decoder 200 decodes encoded data generated by the image encoding device 1, and outputs quantized transform coefficients to the inverse quantizer/inverse transformer 210. Moreover, the entropy code decoder 200 acquires an index of an intra prediction mode and an index of an orthogonal transform type of types (in the horizontal direction, the vertical direction). Here, a description will be continued, assuming that the index of the intra prediction mode indicates any one of the normal CCIP mode, the CCIP_A mode, and the CCIP_L mode. The cross-component intra predictor 241a generates a predicted chroma block by performing cross-component intra prediction according to the mode indicated by the index.

(Normal CCIP Mode)

In a case of the normal CCIP mode (step S202: YES), in step S203, the candidate generator 251 generates candidates including DCT-2, DCT-8, and DST-7, as horizontal-direction candidates. The candidate generator 251 generates candidates including DCT-2, DCT-8, and DST-7, as vertical-direction candidates.

In step S207, the type selector 252 selects, from among the candidates (in the horizontal direction, the vertical direction) generated by the candidate generator 251, an orthogonal transform type (in the horizontal direction, the vertical direction each) to be applied to inverse orthogonal transform processing on the transform coefficients, based on the index of the orthogonal transform type (in the horizontal direction, the vertical direction each) inputted from the entropy code decoder 200.

In step S208, the inverse transformer 212 restores chroma prediction residuals by performing inverse orthogonal transform processing (in the horizontal direction, the vertical direction) on the transform coefficients, by using the orthogonal transform type selected by the type selector 252. Thereafter, the combiner 220 restores (decodes) an original chroma block by synthesizing the restored chroma prediction residuals and the predicted chroma block generated by the cross-component intra predictor 241a.

(CCIP_L Mode)

In a case of the CCIP_L mode (step S204: YES), in step S205, the candidate generator 251 generates a candidate including only DST-7, as a horizontal-direction candidate. The candidate generator 251 generates candidates including DCT-8 and DST-7, as vertical-direction candidates.

In step S207, the type selector 252 selects any one of DCT-8 and DST-7 for the vertical direction, based on the index of the orthogonal transform type (in the vertical direction) inputted from the entropy code decoder 200. As for the horizontal direction, since DST-7 is only the candidate, the type selector 252 selects DST-7 for the horizontal direction.

In step S208, the inverse transformer 212 restores chroma prediction residuals by performing inverse orthogonal transform processing (in the horizontal direction, the vertical direction) on the transform coefficients, by using the orthogonal transform types selected by the type selector 252. Thereafter, the combiner 220 restores (decodes) an original chroma block by synthesizing the restored chroma prediction residuals and the predicted chroma block generated by the cross-component intra predictor 241a.

(CCIP_A Mode)

In a case of the CCIP_A mode (step S204: NO), in step S206, the candidate generator 251 generates a candidate including only DST-7, as a vertical-direction candidate. The candidate generator 251 generates candidates including DCT-8 and DST-7, as horizontal-direction candidates.

In step S207, the type selector 252 selects any one of DCT-8 and DST-7 for the horizontal direction, based on the index of the orthogonal transform type (in the horizontal direction) inputted from the entropy code decoder 200. As for the vertical direction, since DST-7 is the only candidate, the type selector 252 selects DST-7 for the horizontal direction.

In step S208, the inverse transformer 212 restores chroma prediction residuals by performing inverse orthogonal transform processing (in the horizontal direction, the vertical direction) on the transform coefficients, by using the orthogonal transform types selected by the type selector 252. Thereafter, the combiner 220 restores (decodes) an original chroma block by synthesizing the restored chroma prediction residuals and the predicted chroma block generated by the cross-component intra predictor 241a.

4. Summary of the Embodiment

As described above, according to the image encoding device and the image decoding device 2 in the present embodiment, even when positions of neighbouring decoded pixels referred to in cross-component intra prediction are to only any one of the top, the bottom, the left, and the right of a chroma block (that is, in a case of the CCIP_A mode or the CCIP_L mode), transform processing (orthogonal transform processing and inverse orthogonal transform processing) can be performed by using an orthogonal transform type or types suitable to an energy distribution trend of prediction residuals. Accordingly, encoding efficiency can be improved.

According to the image encoding device 1 and the image decoding device 2 in the present embodiment, by generating candidates for the orthogonal transform type that differ between the first mode (normal CCIP mode) and the second mode (CCIP_A mode or CCIP_L mode), transform processing (orthogonal transform processing and inverse orthogonal transform processing) can be performed by using an orthogonal transform type or types suitable to an energy distribution trend of prediction residuals in the second mode. Accordingly, encoding efficiency can be improved.

According to the image encoding device 1 and the image decoding device 2 in the present embodiment, when the second mode is selected, by generating candidates for the orthogonal transform type that differ between transform processing in the horizontal direction and transform processing in the vertical direction, transform processing can be performed by using an orthogonal transform type suitable to an energy distribution trend of prediction residuals in each of the horizontal direction and the vertical direction. Accordingly, encoding efficiency can be improved.

5. Modified Example 1

In the above-described operation examples according to the embodiment, an example is described in which when only one candidate is generated as a candidate for the orthogonal transform type in the horizontal direction or the vertical direction, the candidate is generated by using DST-7 as an orthogonal transform candidate. However, any transformation will do if the transformation, similarly to DST-7, has asymmetric impulse responses and is an orthogonal transformation generating smaller coefficients for end points on one side and larger coefficients for end points on another side, and a type of such a transform is not limited to DST-7. For example, DCT-5 that has characteristics similar to DST-7 may be used in place of DST-7.

Figure 8:
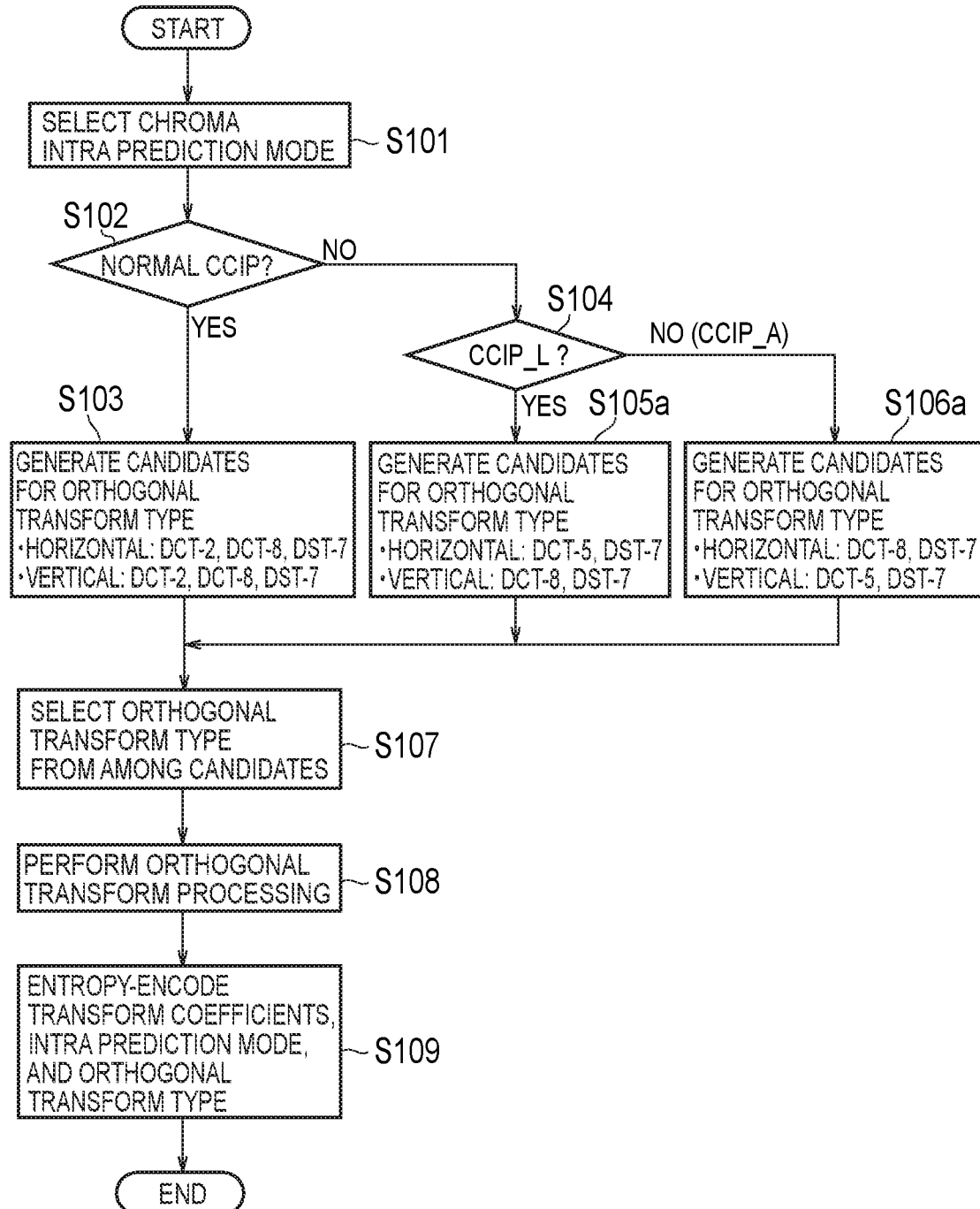
FIG. 8 illustrates an example of operation of the image encoding device according to a modified example 1 of the embodiment.
Figure 9:
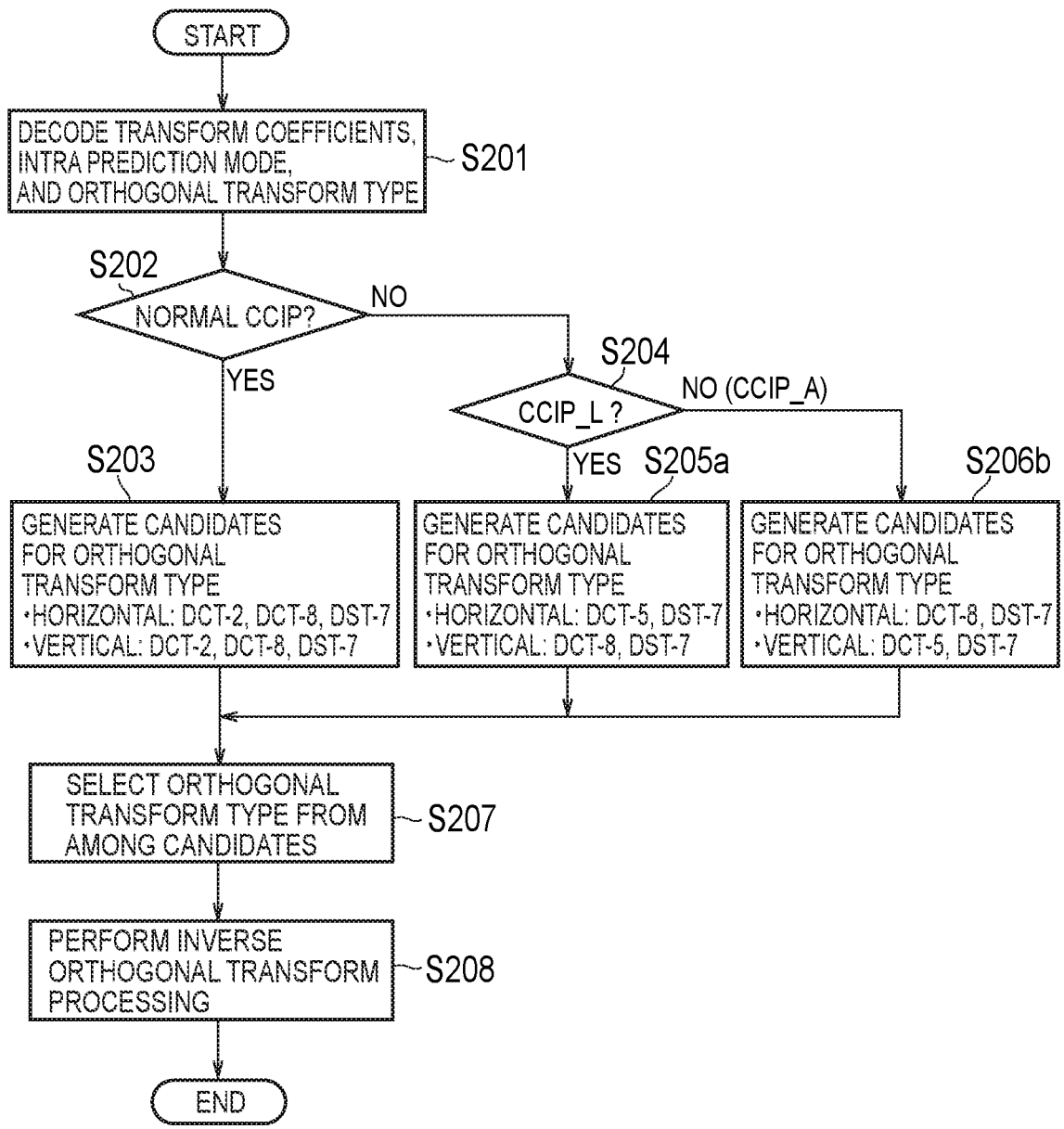
FIG. 9 illustrates an example of operation of the image decoding device according to the modified example 1 of the embodiment.

Alternatively, DCT-5 and DST-7 may be selectively applied. FIG. 8 illustrates an example of operation of the image encoding device 1 according to the present modified example. FIG. 9 illustrates an example of operation of the image decoding device 2 according to the present modified example. Here, differences from the above-described operation examples according to the embodiment will be described.

As illustrated in FIG. 8, in a case of CCIP_L (step S104: YES), in step S105a, the candidate generator 181 generates candidates including DCT-5 and DST-7, as horizontal-direction candidates. The candidate generator 181 generates candidates including DCT-8 and DST-7, as vertical-direction candidates. In such a case, in step S107, the type selector 182 selects any one of DCT-5 and DST-7 for the horizontal direction, and selects any one of DCT-8 and DST-7 for the vertical direction.

In a case of CCIP_A (step S104: NO), in step S106a, the candidate generator 181 generates candidates including DCT-5 and DST-7, as vertical-direction candidates. The candidate generator 181 generates candidates including DCT-8 and DST-7, as horizontal-direction candidates.

In step S107, the type selector 182 selects any one of DCT-5 and DST-7 for the vertical direction, and selects any one of DCT-8 and DST-7 for the horizontal direction.

As illustrated in FIG. 9, in a case of the CCIP_L mode (step S204: YES), in step S205a, the candidate generator 251 generates candidates including DCT-5 and DST-7, as horizontal-direction candidates. The candidate generator 251 generates candidates including DCT-8 and DST-7, as vertical-direction candidates.

In step S207, the type selector 252 selects any one of DCT-5 and DST-7 for the horizontal direction, based on the index of the orthogonal transform type (in the horizontal direction) inputted from the entropy code decoder 200, and selects any one of DCT-8 and DST-7 for the vertical direction, based on the index of the orthogonal transform type (in the vertical direction) inputted from the entropy code decoder 200.

In a case of the CCIP_A mode (step S204: NO), in step S206a, the candidate generator 251 generates candidates including DCT-5 and DST-7, as vertical-direction candidates. The candidate generator 251 generates candidates including DCT-8 and DST-7, as horizontal-direction candidates.

In step S207, the type selector 252 selects any one of DCT-5 and DST-7 for the vertical direction, based on the index of the orthogonal transform type (in the vertical direction) inputted from the entropy code decoder 200, and selects any one of DCT-8 and DST-7 for the horizontal direction, based on the index of the orthogonal transform type (in the horizontal direction) inputted from the entropy code decoder 200.

Note that although the present modified example describes an example in which candidates are generated by using DST-7 and DCT-5 as orthogonal transform candidates, types of a transformation are not limited to DST-7 and DCT-5 if the transformation has characteristics similar to DST-7 or DCT-5 and has asymmetric impulse responses.

6. Modified Example 2

In the above-described embodiment and the modified example 1, the numbers of orthogonal transform candidates generated when the CCIP_L mode is applied and when the CCIP_A mode is applied are made smaller than the number of orthogonal transform candidates in the normal CCIP mode, whereby a bit length of a flag transmitted from the image encoding device 1 to the image decoding device 2 can be reduced. However, a configuration as described below may also be made.

Specifically, in the present modified example, when the CCIP_A mode is applied, application of DCT-8 in the vertical direction is prohibited so that DCT-8 is not included in vertical-direction candidates. When the CCIP_L mode is applied, application of DCT-8 in the horizontal direction is prohibited so that DCT-8 is not included in horizontal-direction candidates. Other orthogonal transform candidates are similar to the orthogonal transform candidates in the normal CCIP mode.

Figure 10:
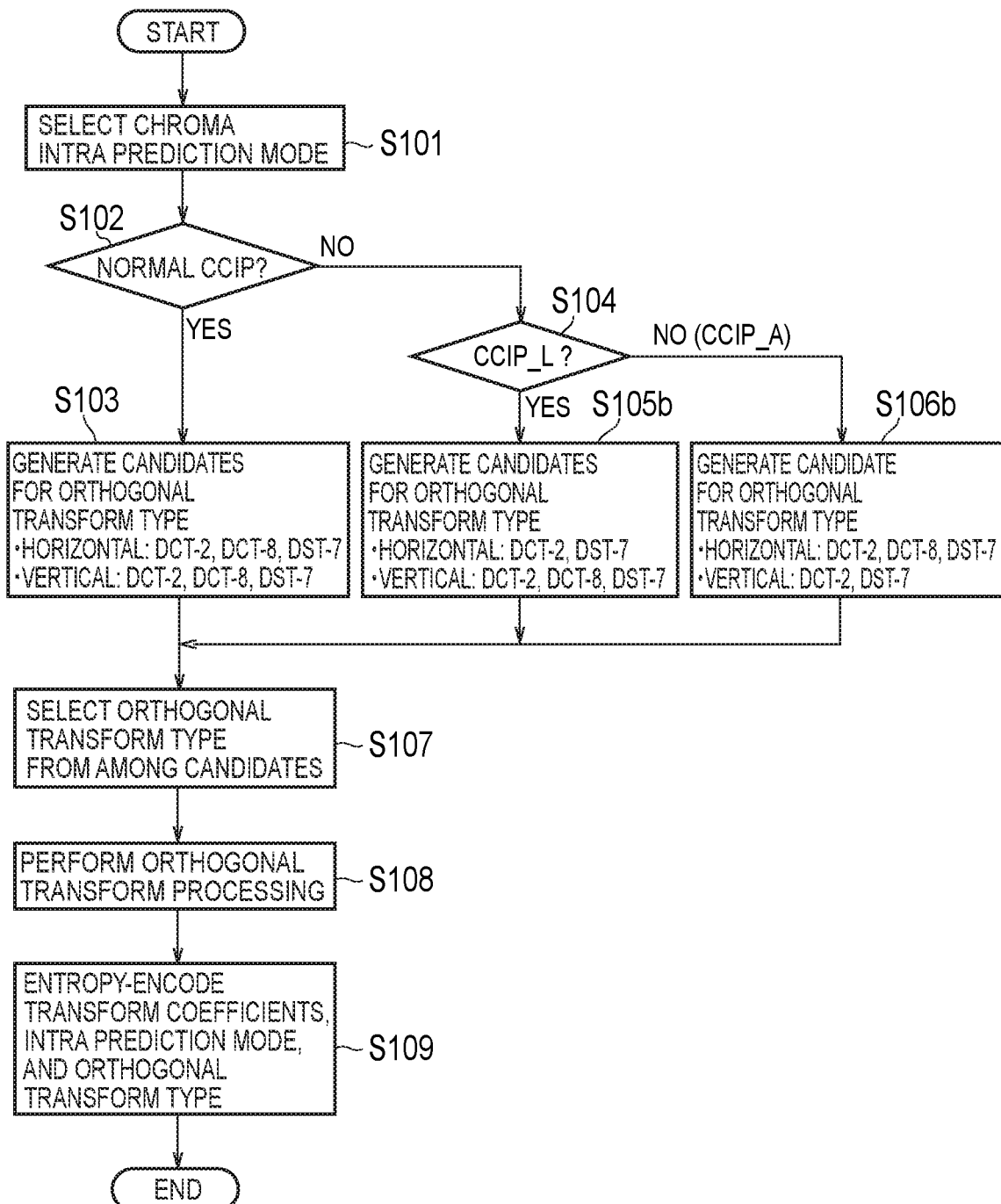
FIG. 10 illustrates an example of operation of the image encoding device according to a modified example 2 of the embodiment.

Next, FIG. 10 illustrates an example of operation of the image encoding device 1 according to the present modified example. FIG. 11 illustrates an example of operation of the image decoding device 2 according to the present modified example. A description will be given of differences from the above-described operation examples according to the embodiment.

As illustrated in FIG. 10, when the CCIP_L mode is applied, the candidate generator 181 generates candidates including DCT-2 and DST-7, as horizontal-direction candidates, and generates candidates including DCT-2, DCT-8, and DST-7, as vertical-direction candidates (step S105b).

In step S107, the type selector 182 selects any one of DCT-2 and DST-7 for the horizontal direction, and selects any one of DCT-2, DCT-8, and DST-7 for the vertical direction.

When the CCIP_A mode is applied, the candidate generator 181 generates candidates including DCT-2 and DST-7, as vertical-direction candidates, and generates candidates including DCT-2, DCT-8, and DST-7, as horizontal-direction candidates (step S106b).

In step S107, the type selector 182 selects any one of DCT-2 and DST-7 for the vertical direction, and selects any one of DCT-2, DCT-8, and DST-7 for the horizontal direction.

As illustrated in FIG. 11, when the CCIP_L mode is applied, the candidate generator 251 generates candidates including DCT-2 and DST-7, as horizontal-direction candidates, and generates candidates including DCT-2, DCT-8, and DST-7, as vertical-direction candidates (step S205b).

In step S207, the type selector 252 selects any one of DCT-2 and DST-7 for the horizontal direction, based on the index of the orthogonal transform type (in the horizontal direction) inputted from the entropy code decoder 200. The type selector 252 selects any one of DCT-2, DCT-8, and DST-7 for the vertical direction, based on the index of the orthogonal transform type (in the vertical direction) inputted from the entropy code decoder 200. When the CCIP_A mode is applied, the candidate generator 251 generates candidates including DCT-2 and DST-7, as vertical-direction candidates, and generates candidates including DCT-2, DCT-8, and DST-7, as horizontal-direction candidates.

In step S207, the type selector 252 selects any one of DCT-2 and DST-7 for the vertical direction, based on the index of the orthogonal transform type (in the vertical direction) inputted from the entropy code decoder 200, and selects any one of DCT-2, DCT-8, and DST-7 for the horizontal direction, based on the index of the orthogonal transform type (in the horizontal direction) inputted from the entropy code decoder 200.

7. Other Embodiments

In the above-described embodiment, an example is described in which for the normal CCIP mode, a CCIP mode is used in which a chroma block is predicted by referring to neighbouring decoded luminance and chroma pixels to the top side and the left side of the chroma block. However, instead of such a mode, a mode may be used in which a chroma block is predicted by referring to neighbouring decoded luminance and chroma pixels to a bottom side and a right side of the chroma block.

In the above-described embodiment, an example is described in which the CCIP_A mode is used in which a chroma block is predicted by referring to neighbouring decoded luminance and chroma pixels only to the top side of the chroma block. However, instead of such a mode, a mode may be used in which a chroma block is predicted by referring to neighbouring decoded luminance and chroma pixels only to the bottom side of the chroma block.

In the above-described embodiment, an example is described in which the CCIP_L mode is used in which a chroma block is predicted by referring to neighbouring decoded luminance and chroma pixels only to the left side of the chroma block. However, instead of such a mode, a mode may be used in which a chroma block is predicted by referring to neighbouring decoded luminance and chroma pixels only to the right side of the chroma block.

In the above-described embodiment, orthogonal transform candidates may include a transform skip in which a transformation is not applied to a residual signal. The transform skip is to scale a residual signal into transform coefficients, without applying a transformation such as DCT or DST.

In the embodiment described above, by way of example, a video signal consists of luminance-chroma components (YCbCr). A video signal may, however, consist of three primary color components (RGB).

A program may be provided to cause a computer to execute the operations of the image encoding device 1 and a program may be provided to cause a computer to execute the operations of the image decoding device 2. The program may be stored in a computer-readable medium. The program can be installed on a computer from a computer-readable medium having the program stored thereon. The computer-readable medium having the program stored thereon may be a non-transitory recording medium. The non-transitory recording medium may include, but is not limited to, a CD-ROM and a DVD-ROM. The image encoding device 1 may be embodied as a semiconductor integrated circuit (chipset, SoC, etc.) by integrating the circuits that execute the respective operations of the image encoding device 1. Similarly, the image decoding device 2 may be embodied as a semiconductor integrated circuit by integrating the circuits that execute the respective operations of the image decoding device 2.

The embodiments have been described in detail above with reference to the drawings. Specific configurations are not limited to the above-described configurations, and various design changes, and the like are possible within the scope not deviating from the gist.

This application claims the priority of Japanese Patent Application No. 2018-152988 (filed on Aug. 15, 2018) the contents of which are all incorporated herein by reference.

The invention claimed is:

1. An image encoding device comprising:
    a cross-component intra predictor configured to generate a predicted block of a second component through cross-component intra prediction in which a block of the second component to be encoded is predicted by referring to, as neighbouring decoded pixels adjacent to the block of the second component, decoded pixels of a first component and decoded pixels of the second component;
    a candidate generator configured to generate candidates for a transform type to be applied to transform processing on prediction residuals that represent errors between the predicted block of the second component and the block of the second component; and
    a transformer configured to perform the transform processing on the prediction residuals by using a transform type selected from among the candidates generated by the candidate generator,
    wherein the candidate generator is configured to generate the candidates for the transform type, based on positions of the neighbouring decoded pixels referred to in the cross-component intra prediction.

2. The image encoding device according to claim 1, wherein the first component is a luminance component, and the second component is a chroma component.

3. The image encoding device according to claim 1, wherein the candidate generator is configured to generate the candidates for the transform type, depending on whether or not the positions of the neighbouring decoded pixels referred to in the cross-component intra prediction are to only any one of a top, a bottom, a left, and a right of the block of the second component.

4. The image encoding device according to claim 1, wherein
    the cross-component intra predictor is configured to perform the cross-component intra prediction by using a mode selected from among a plurality of modes including a first mode and a second mode,
    the first mode is a mode in which the block of the second component is predicted by referring to the neighbouring decoded pixels to both a top side and a left side of the block of the second component,
    the second mode is a mode in which the block of the second component is predicted by referring to the neighbouring decoded pixels only to the top side or the left side of the block of the second component, and
    the candidate generator is configured to
    generate first candidates including one or more transform types, as the candidates for the transform type when the first mode is selected, and
    generate second candidates that are different from the first candidates, as the candidates for the transform type when the second mode is selected.

5. The image encoding device according to claim 4, wherein
    the second candidates include horizontal-direction candidates that are one or more candidates for a transform type to be applied to the transform processing in a horizontal direction, and vertical-direction candidates that are one or more candidates for a transform type to be applied to the transform processing in a vertical direction, and the horizontal-direction candidates and the vertical-direction candidates are at least partially different from each other.

6. An image decoding device comprising:

a cross-component intra predictor configured to generate a predicted block of a second component through cross-component intra prediction in which a block of the second component to be decoded is predicted by referring to, as neighbouring decoded pixels adjacent to the block of the second component, decoded pixels of a first component and decoded pixels of the second component;

a candidate generator configured to generate candidates for a transform type to be applied to inverse transform processing on transform coefficients of the second component, the transform coefficients corresponding to prediction residuals that represent errors between the predicted block of the second component and the block of the second component; and an inverse transformer configured to perform the inverse transform processing on the transform coefficients of the second component by using a transform type selected from among the candidates generated by the candidate generator, wherein the candidate generator is configured to generate the candidates for the transform type, based on positions of the neighbouring decoded pixels referred to in the cross-component intra prediction.

7. The image decoding device according to claim 6, wherein the first component is a luminance component, and the second component is a chroma component.

8. The image decoding device according to claim 6, wherein the candidate generator is configured to generate the candidates for the transform type, depending on whether or not the positions of the neighbouring decoded pixels referred to in the cross-component intra prediction are to only any one of a top, a bottom, a left, and a right of the block of the second component.

9. The image decoding device according to claim 6, wherein the cross-component intra predictor is configured to perform the cross-component intra prediction by using a mode selected from among a plurality of modes including a first mode and a second mode, the first mode is a mode in which the block of the second component is predicted by referring to the neighbouring decoded pixels to both a top side and a left side of the block of the second component, the second mode is a mode in which the block of the second component is predicted by referring to the neighbouring decoded pixels only to the top side or the left side of the block of the second component, and the candidate generator is configured to generate first candidates including one or more transform types, as the candidates for the transform type when the first mode is selected, and generate second candidates that are different from the first candidates, as the candidates for the transform type when the second mode is selected.

10. The image decoding device according to claim 9, wherein the second candidates include horizontal-direction candidates that are one or more candidates for a transform type to be applied to the inverse transform processing in a horizontal direction, and vertical-direction candidates that are one or more candidates for a transform type to be applied to the inverse transform processing in a vertical direction, and the horizontal-direction candidates and the vertical-direction candidates are at least partially different from each other.

11. An image decoding method comprising:

generating, via a processor, a predicted block of a second component through cross-component intra prediction in which a block of the second component to be decoded is predicted by referring to, as neighbouring decoded pixels adjacent to the block of the second component, decoded pixels of a first component and decoded pixels of the second component;

generating, via the processor, candidates for a transform type to be applied to inverse transform processing on transform coefficients of the second component, the transform coefficients corresponding to prediction residuals that represent errors between the predicted block of the second component and the block of the second component; and performing, via the processor, the inverse transform processing on the transform coefficients of the second component by using a transform type selected from among the generated candidates, wherein the generating the candidates comprises generating, via the processor, the candidates for the transform type, based on positions of the neighbouring decoded pixels referred to in the cross-component intra prediction.

\* \* \* \* \*